(12) United States Patent
Ikari et al.

(10) Patent No.: US 9,001,395 B2
(45) Date of Patent: Apr. 7, 2015

(54) IMAGE READING DEVICE WITH ILLUMINATION MOVEMENT BASED ON SHEET CHARACTERISTICS, AND SHEET HANDLING APPARATUS INCLUDING THE SAME

(75) Inventors: Seiji Ikari, Kanagawa-ken (JP); Junji Miura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 119 days.

(21) Appl. No.: 13/600,747

(22) Filed: Aug. 31, 2012

(65) Prior Publication Data

US 2013/0094043 A1 Apr. 18, 2013

(30) Foreign Application Priority Data

Oct. 12, 2011 (JP) .................................. 2011-225078

(51) Int. Cl.
*H04N 1/04* (2006.01)
*H04N 1/028* (2006.01)
(Continued)

(52) U.S. Cl.
CPC ....... *H04N 1/02815* (2013.01); *H04N 1/02885* (2013.01); *H04N 1/02895* (2013.01); *H04N 1/1235* (2013.01); *H04N 1/125* (2013.01); *H04N 1/193* (2013.01); *H04N 2201/0081* (2013.01);
(Continued)

(58) Field of Classification Search
CPC .......... H04N 2201/02416; H04N 2201/02433; H04N 2201/02435; H04N 2201/02439; H04N 2201/02462; H04N 2201/02409; H04N 2201/0456; H04N 1/1017; H04N 2201/04794; H04N 2201/433; H04N 1/0287; H04N 1/0303; H04N 1/0305; H04N 1/00681; H04N 1/00721; H04N 1/00737; H04N 1/00745; H04N 1/00753; H04N 1/00806; H04N 1/1235; H04N 1/125; H04N 1/193; H04N 1/0081; G06K 9/036
USPC .................. 358/1.13, 497, 474, 475, 482, 486
See application file for complete search history.

(56) References Cited

U.S. PATENT DOCUMENTS 6,507,416 B1 * 1/2003 Tang ............................. 358/497
6,744,469 B1 6/2004 Gudenburr et al.
(Continued)

FOREIGN PATENT DOCUMENTS

| EP | 2 355 483 A2 | 8/2011 |
|---|---|---|
| JP | 2009-260870 A | 11/2009 |
| JP | 2010-183163 A | 8/2010 |

OTHER PUBLICATIONS

English Machine Translation of JP-2004-193744 (Hirai, Published Aug. 7, 2004).*

(Continued)

*Primary Examiner* — Benny Q Tieu
*Assistant Examiner* — Juan M Guillermety
(74) *Attorney, Agent, or Firm* — Posz Law Group, PLC (57) ABSTRACT

An image reading device includes an illuminating means for illuminating a reading position through which a sheet conveyed by conveying means passes, optical reading means for reading reflected light of the sheet illuminated by the illuminating means when the sheet passes the reading position, a white reference plate disposed opposite to the optical reading means with the reading position sandwiched therebetween, and moving structure means for moving a placement position of the illuminating means based on a placement position of the white reference plate, and storage means is included for storing information in a searchable manner.

3 Claims, 8 Drawing Sheets (51) Int. Cl.
*H04N 1/12* (2006.01)
*H04N 1/00* (2006.01)
*H04N 1/024* (2006.01)
*H04N 1/193* (2006.01)

(52) U.S. Cl.
CPC ....... *H04N 1/00806* (2013.01); *H04N 1/02481* (2013.01); *H04N 2201/02435* (2013.01)

(56) References Cited

U.S. PATENT DOCUMENTS

| | | |
|---|---|---|
| 8,159,728 B2 | 4/2012 | Miura et al. |
| 2008/0278771 A1* | 11/2008 | Futami .......................... 358/474 |
| 2009/0316223 A1 | 12/2009 | Takeuchi |
| 2012/0099148 A1* | 4/2012 | Tokura ........................ 358/1.15 |

OTHER PUBLICATIONS

Extended European Search Report dated May 31, 2013 issued in corresponding EP patent application No. 12183290.1-1903.
Background Art Information Sheet provided by Applicants. (1 page total), NPL filed on Aug. 31, 2012 including: JP-2010-183163 JP-2013-061765.
Office action dated Sep. 3, 2014 in the corresponding Chinese Patent Office Application No. 201210331390.1.

* cited by examiner

IMAGE READING DEVICE WITH ILLUMINATION MOVEMENT BASED ON SHEET CHARACTERISTICS, AND SHEET HANDLING APPARATUS INCLUDING THE SAME

CROSS-REFERENCE TO RELATED APPLICATION

This application is based upon and claims the benefit of priority from Japanese Patent Application No. 2011-225078, filed on Oct. 12, 2011, the entire contents of which are incorporated herein by reference.

FIELD

Exemplary embodiments described herein relate to an image reading device and a sheet handling apparatus.

BACKGROUND

A conventional image reading device includes a conveyor path, an illuminating device, and a camera. When a sheet is conveyed by the conveyor path arrives at a reading position, reflected light from the sheet which is illuminated by the illuminating device is condensed to a line sensor by a lens of the camera. The line sensor is scanned in a direction orthogonal to a conveying direction, so that the reflected light from the sheet is read in synchronization with the scanning. Data thus read is converted into a two-dimensional image by an image acquisition portion.

However, the image reading device thus configured has such a problem that the conveyance of sheets causes the sheets to be uneven in a height direction of the sheets and light intensity distribution gradients (distribution) in the height direction are obtained as brightness of the sheets without any change when image reading is performed. In order to solve this problem, there is suggested a method to equalize the light intensity distribution in the illuminating device in the height direction.

For example, Japanese Patent Application Laid-Open No. 2008-219244 discloses a reading device in which illuminating means formed in combination of an illumination and a rod-like light guide includes a first emission portion for illuminating a sheet obliquely, and a second emission portion for emitting light horizontally in conveying direction, and which is arranged to reflect light from the second emission portion and to obliquely illuminate the sheet in an opposite manner to light from the first emission portion with respect to an optical axis of image reading of the sheet, thereby resulting in that the reading device has resistance to flutters and tilts of sheets.

Further, Japanese Patent Application Laid-Open No. 2010-483163 discloses a reading device in which a cylindrical optics is disposed in front of a rod-like illumination, and the illumination, which emits quite parallel light, obliquely illuminates a sheet from two directions opposite to each other with respect to an optical axis of image reading of the sheet, thereby resulting in that the reading device has resistance to flutters and tilts of sheets.

However, in these conventional image reading devices described above, the quantity of reflected light (reflecting luminance) from a sheet varies depending on a distance between a white reference plate and the sheet. That is, when a sheet flutters on a top surface of the white reference plate disposed at a reading position, the distance between the white reference plate and the sheet varies. This varies the quantity of reflected light from the sheet, thereby resulting in that, as an image reading device, the conventional image reading devices cannot obtain an image suitable for human sight. Further, as a sheet inspection device, the conventional image reading devices cannot obtain a stable reflection image, thereby causing such a problem that highly precise inspection cannot be performed. Particularly, a degree of influence by the white reference plate is different between a case of a thick sheet and a case of a thin sheet, thereby causing such a problem that these sheets have different quantities of reflected light from their surfaces.

DETAILED DESCRIPTION

In general, according to one embodiment, there is provided an image reading device including: illuminating means for illuminating a reading position where a sheet conveyed by conveying means passes, optical reading means for reading reflected light of the sheet illuminated by the illuminating means, when the sheet passes the reading position, a white reference plate disposed opposite to the optical reading means with the reading position sandwiched therebetween, moving structure means for moving a placement position of the illuminating means based on a placement position of the white reference plate, storage means for storing the following amounts in a searchable manner, an illuminating angle moving amount by which the placement position of the illuminating means is moved by the moving structure means so as to change an illuminating angle formed by a line connecting an illumination center of the illuminating means to the reading position with respect to a conveyor path, an X direction moving amount by which the placement position of the illuminating means is moved by the moving structure means in an X direction parallel to a conveying direction while maintaining the illuminating angle, and a Y direction moving amount by which the placement position of the illuminating means is moved by the moving structure means in a Y direction which is a lengthwise direction of an illumination optical axis while maintaining the illuminating angle, acquisition means for, when the sheet passes the reading position, acquiring, in advance, a variation property of reflected light vertically varying within a predetermined acceptable variation range in a height direction in which a reading surface of the sheet approaches a side of the illuminating means by the conveying means based on the white reference plate, and a height-direction light intensity distribution property of the sheet illuminated by the illuminating means at the reading position, and control means for setting, in the moving structure means, the illuminating angle moving amount, the X direction moving amount, and the Y direction moving amount stored in the storage means, so as to obtain a light intensity distribution property offsetting the variation property acquired by the acquisition means.

The image reading device of Embodiment 1 includes: a conveyor path for conveying a sheet, an illuminating device for illuminating the reading position where the sheet conveyed by the conveyor path passes, optical reading means for reading reflected light of the sheet, a white reference plate disposed opposite to the optical reading means with the reading position sandwiched therebetween, reflection property acquisition means for acquiring a reflection property of the reflected light caused by conveyance flutters of the sheet at the reading position, light intensity distribution property acquisition means for acquiring a height-direction light intensity distribution property of the sheet at the reading position, and moving means for moving a placement position of the illuminating device, wherein the image reading device acquires the reflection property of the reflected light in advance, and when a sheet type or thickness to be processed is specified, the image reading device offsets the placement position of the illuminating device by the moving means. Embodiment 2 shows an embodiment of a sheet handling apparatus equipped with the image reading device according to Embodiment 1. The following give explanations with reference to drawings.

Figure 1A:
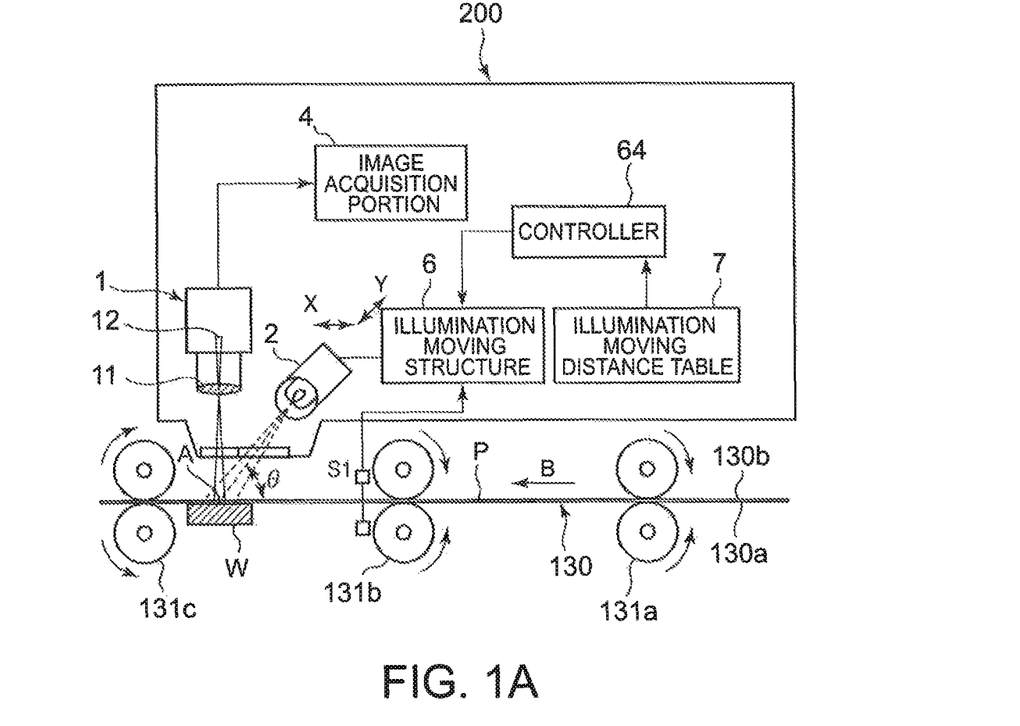
FIGS. 1A and 1B are schematic configuration diagrams of an image reading device according to Embodiment 1.
Figure 1B:
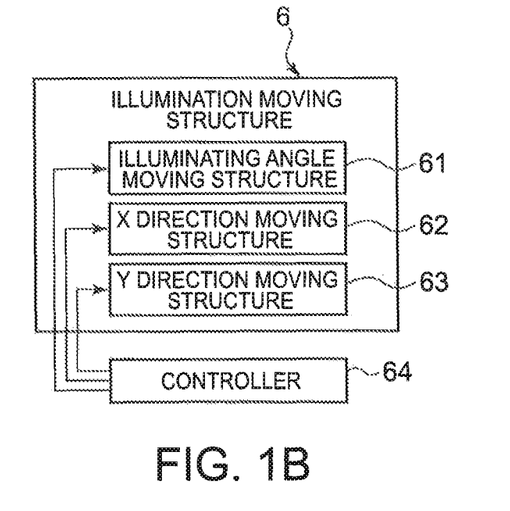

[Embodiment 1] FIGS. 1A and 1B are schematic configuration diagrams of an image reading device 200 according to Embodiment 1. FIG. 1A is an overall schematic configuration diagram, and FIG. 1B is a schematic configuration diagram of an illumination moving structure (moving means) 6.

The image reading device 200 includes a conveyor path 130 which conveys a sheet P, an illuminating device 2, and a white reference plate W. The sheet P to be conveyed by the conveyor path 130 is conveyed in a direction of an arrow B as illustrated, and arrives at a reading position A. The white reference plate W is disposed at an opposed position of a camera 1 for reading reflected light of the illuminating device 2 which illuminates the sheet P passing this reading position A and the sheet P passing the reading position A with respect to the conveyor path 130.

The conveyor path 130 is constituted by conveyor rollers 131a, 131b, and 131c, and conveyor belts 130a and 130b suspended over these conveyor rollers 131a, 131b, and 131c. The sheet P is sandwiched between these conveyor belts 130a and 130b, and conveyed in the direction of the arrow B as illustrated.

The camera 1 is configured to have a lens 11 and a line sensor 12. An image at the reading position A is formed on the line sensor 12 through the lens 11. The number of pixels of the line sensor 12, an imaging magnification, and the like of the lens 11 are set in advance according to a reading range of the reading position A and a reading resolution.

When the sheet P conveyed in the direction of the arrow B as illustrated arrives at the reading position A as such, a one-dimensional image in a direction intersecting the conveying direction is read by the line sensor 12 of the camera 1. Each of R (red), G (green), and B (blue), which are color components of the line sensor 12, of the one-dimensional image thus read is separately written into a memory (not illustrated) provided in the image acquisition portion 4. The sheet P is conveyed in the direction of the arrow B as illustrated at a predetermined speed, and accordingly, a one-dimensional image of the whole sheet P is acquired and a two-dimensional image is generated.

FIG. 1B is a schematic configuration diagram of an illumination moving structure 6. The illumination moving structure (moving means) 6 is constituted by an illuminating angle moving structure (illuminating angle moving means) 61, an X direction moving structure (X direction moving means) 62, and a Y direction moving structure (Y direction moving means) 63. Each of the structures 61 to 63 of the illumination moving structure 6 is connected to a controller (control means) 64. The controller 64 controls movement of each of the structures 61 to 63 based on an illuminating angle moving amount, an X direction moving amount, and a Y direction moving amount which are acquired from an illumination moving distance table (storage means) 7 based on search conditions as described later.

When an illuminating angle formed by an illumination optical axis connecting an illumination center of the illuminating device 2 to the reading position A with respect to the conveyor path 130 is assumed as θ, the controller 64 can perform the following movement controls (1) to (3) with respect to the illuminating device 2.

(1) The controller 64 can move the illuminating device 2 in a direction of an arrow X as illustrated, which is parallel to the conveying direction, while maintaining the illuminating angle θ, (2) the controller 64 can move the illuminating device 2 in a direction of an arrow Y as illustrated along a length of the illumination optical axis (an illumination optical path length), while maintaining the illuminating angle θ, and (3) the controller 64 can move (rotate) the illuminating device 2 in directions in which the illuminating angle (increases and decreases.

Note that the moving amount of the illuminating device 2 is set in such a manner that the after-mentioned reflecting luminance property (FIG. 5) with respect to a sheet floating amount and the after-mentioned height-direction light intensity distribution property (FIG. 6) of the illuminating device 2 at the reading position A are calculated according to a type, a quality, a thickness, and the like of a sheet P to be processed, and the moving amount of the illuminating device 2 is set based on this calculation result.

For example, the thickness of a sheet can be detected by a transmission sensor S1. The illumination moving distance table 7 is referred to based on the thickness of the sheet thus detected by this transmission sensor S1, and moving amounts (a general term of the illuminating angle moving amount, the X direction moving amount, and the Y direction moving amount) are set.

Note that the detection method of the thickness of a sheet is not limited to the above method. For example, there is another method to detect so-called change amounts of rollers, which are obtained when roller positions are changed due to insertion of a sheet to be conveyed between the rollers. These methods have different advantages and therefore which method is used is determined according to a material and the like of a sheet which is a target medium to be detected. The above method using a transmission sensor is simple to detect the thickness of a sheet and therefore preferable in a case where the quality of sheets is uniform like securities just after printing. On the other hand, like a normal sheet and a damaged sheet, which are of the same type, if some damage of a sheet gives a change to a transmission light amount as a result of having been used, the reliability of measurement results decreases. In such a case, the aforementioned method to detect changes of a sheet between rollers is preferred.

FIGS. 2A to 2D are schematic diagrams explaining that a backing effect varies depending on the thickness of a sheet. Note that a backing denotes a member disposed on a backside of a sheet, which is a target medium to be detected, and the backing herein corresponds to a white reference plate W.

Figure 2A:
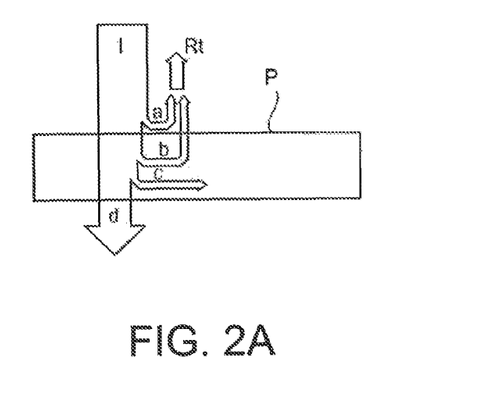
FIGS. 2A to 2D are schematic diagrams each of which explains a backing effect.

FIG. 2A is a view illustrating a relation between incident light l and reflected light Rt (which may be referred to as reflecting luminance Rt or a reflecting luminance component Rt) in a case where no white reference plate is provided (no backing is provided) and the thickness of a sheet P is thin. Such a case corresponds to, for example, a case of a thin sheet of paper with no back or a case of a thin sheet with a black back (non-reflective member). In this case, the incident light l is distributed into a component a which reflects off a surface of the sheet P, a component b which enters an inside of the sheet P, diffuses, and returns upward again, a component c which enters the inside of the sheet P and absorbed therein, and a component d which transmits through the sheet P. At this time, the reflecting luminance Rt of the sheet P is a sum of the component a and the component b, and in a case where the sheet P is thin, the component b returning upward due to internal diffusion is small and the transmissive component d is large, and therefore, even if the sheet P is white, the sheet P appears dark.

Figure 2B:
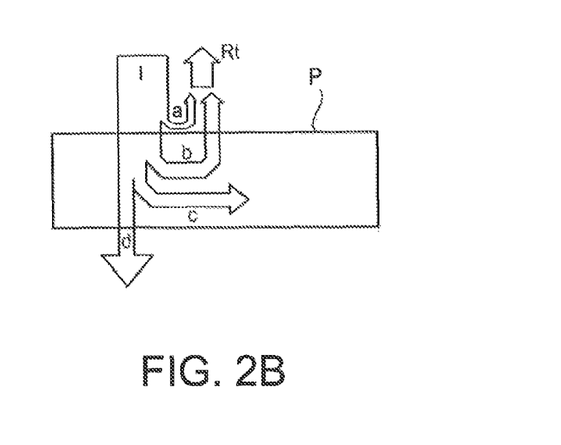

FIG. 2B is a view illustrating a relation between incident light l and reflected light Rt in a case where no white reference plate is provided and the thickness of a sheet P is thick. Such a case corresponds to, for example, a case of a thick sheet P with no back or a case of a thick sheet P with a black back (non-reflective member). In this case, the transmissive component d is small and the component b returning upward due to internal diffusion is large, so that the sheet P appears bright (white). As such, the sheets P appear different in terms of reflecting luminance (a degree of whiteness) in such a case where the sheets have no back or have a black back (non-reflective member).

Figure 2C:
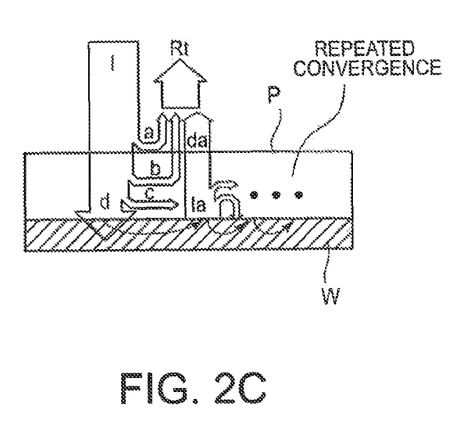
Figure 2D:
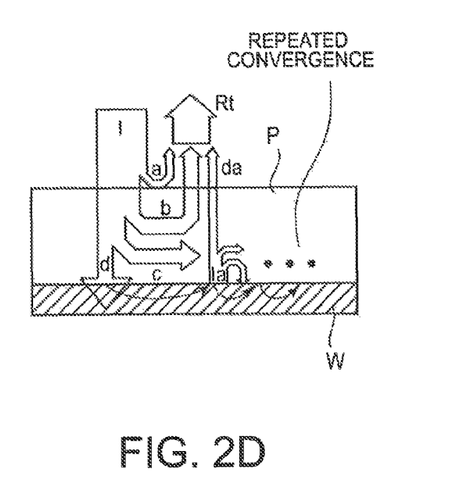

FIGS. 2C and 2D are views in which a white reference plate W (a high-reflective member) is disposed on a back face. Similarly to the effect without any background as illustrated in FIG. 2A or FIG. 2B, incident light l is distributed into the component a, the component b, the component c, and the component d. Since the component d causes a component da which reflects off the white reference plate W disposed on the back face and transmits again through the sheet P upward, the reflecting luminance Rt is a sum of the component a, the component b, and the component da. As illustrated in FIG. 2C, in a case of a thin sheet P, the transmissive component d is large, and the component da which reflects off the white reference plate W disposed on the back face and transmits again through the sheet P upward is also large. Consequently, although the component a and the component b have small reflecting luminance, the brightness (a degree of whiteness) can be secured because of addition of the component da. Further, as illustrated in FIG. 2D, in a case of a thick sheet P, the transmissive component d is small, and the component da which reflects off the white reference plate W provided on the back face and transmits again through the sheet P upward is also small. However, the addition of the component da may be small because the component a and the component b have large brightness. Thus, when the white reference plate W is disposed on the back face, an automatic control effect which does not depend on the thickness of the sheet will work. This is called a backing effect.

Figure 3A:
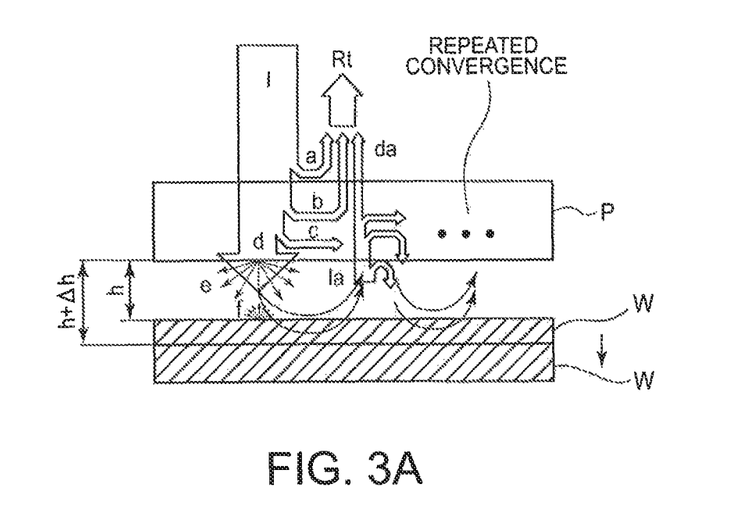
FIGS. 3A and 3B are schematic diagrams to explain a backing effect when a sheet floats from a white reference plate.
Figure 3B:
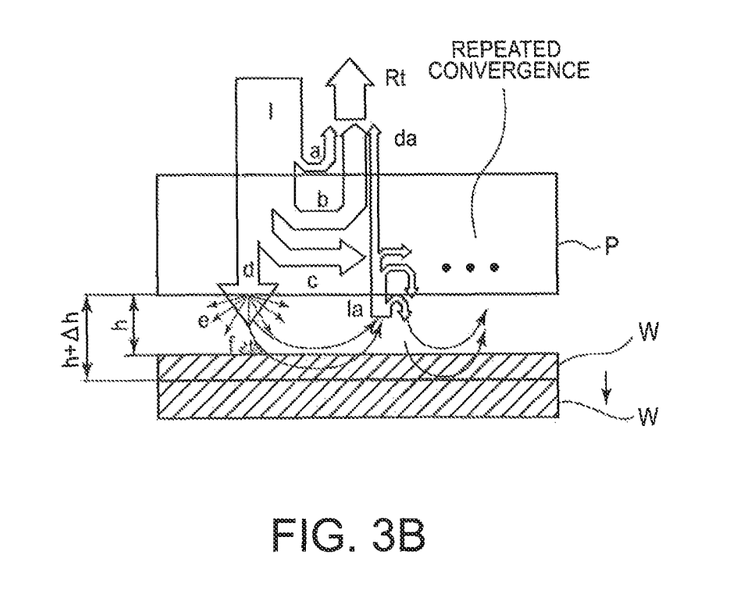

FIGS. 3A and 3B are schematic diagrams illustrating relations between incident light l and a reflecting luminance component Rt when a sheet P floats from the white reference plate W. When the sheet P is displaced upward by only a distance h with respect to the white reference plate W (the floating amount: h) and when the sheet P is further displaced upward by only a distance Δh (the floating amount: h+Δh), the backing effect of the white reference plate W provided on a reading back face decreases because the sheet P is away from the back face. Hence, the luminance of the sheet P changes due to conveyance flutters. FIG. 3A illustrates a case where a thin sheet P is away from the back face, and the transmissive component d becomes a component e which diffuses to emit outside when it goes out of the sheet P. Since the light thus diffusing broadens as a distance to a surface to be illuminated is farther away, light illuminating the white reference plate W per unit area decreases according to the distance. Light reflected by the white reference plate W also diffuses, so that the light similarly decreases according to a distance to the sheet P. Light la which is incident on the sheet P again further attenuates to be light da which transmits through the sheet P, but the light la decreases more than that in FIG. 2C, thereby resulting in that the reflecting luminance Rt to which the light la is added up decreases greatly. Similarly, even in a case of FIG. 3B in which the sheet P is thick, the component da which transmits through the sheet P again greatly decreases, but since the original component da in FIG. 2D is small, a degree of influence by the distance is different.

As such, it is found that final reflecting luminance varies depending on the distance between the sheet P and the white reference plate W, and its influence depends on the thickness of the sheet P. In view of this, as the image reading device, an image suitable for human sight cannot be obtained, and further, as the sheet inspection device, an image with stable reflecting luminance cannot be obtained, which causes such a problem that highly precise inspection cannot be performed.

Figure 4:
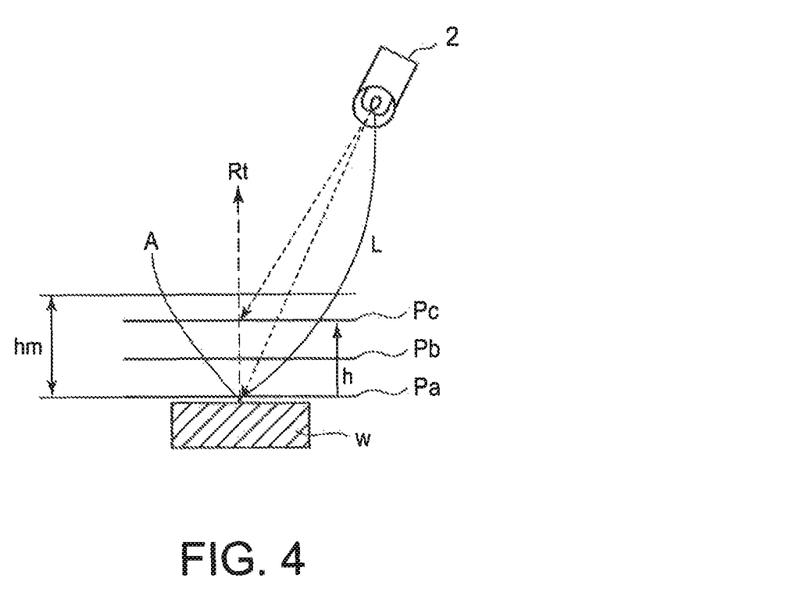
FIG. 4 is a schematic diagram to explain a state in which a sheet floats from a white reference plate.
Figure 5:
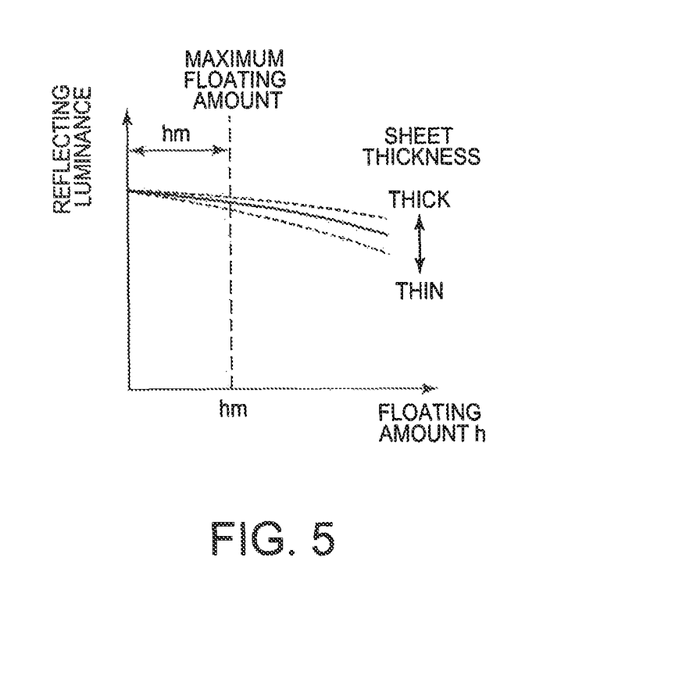
FIG. 5 is a graph illustrating relations between a floating amount of a sheet and reflecting luminance.

FIG. 4 is a schematic diagram to explain a state in which a sheet floats from a white reference plate, and an enlarged view at a reading position A. Further, FIG. 5 is an example of a graph illustrating relations between a floating amount of a sheet and reflecting luminance. The following gives explanations with reference to these drawings. A sheet P is conveyed by the conveyor path 130 and arrives at the reading position A. At this time, the sheet P may come into a state where the sheet P floats upward from a state where the sheet P is closest to the white reference plate W. That is, the sheet P may become, for example, a sheet Pa, Pb, or Pc. These states may occur with random floating amounts h and random frequencies as conveyance flutters. At this time, when illumination light from the illuminating device 2 is assumed constant in a height direction (a floating direction) (when a distance (illumination distance) L from the illuminating device 2 to the reading position A is sufficiently long relative to a largest floating amount hm, the illumination light from the illuminating device 2 may be regarded as constant in a range of the largest floating amount hm), reflecting luminance of the sheet P exhibits a property in which the reflecting luminance decreases according to the floating amount (height position) h of the sheet P (variation property), as illustrated in FIG. 5.

That is, when the distance between the sheet P and the white reference plate W serving as a background becomes large due to the floating amount h of the sheet P, the reflecting luminance is affected by the hacking effect as mentioned above. A decreasing slope of the luminance depends on the thickness of the sheet P, and the slope becomes larger as the sheet P is thinner. Accordingly, even the illumination having a uniform distribution property in the height direction does not allow accurate acquisition of reflecting luminance of the sheet P.

Figure 6:
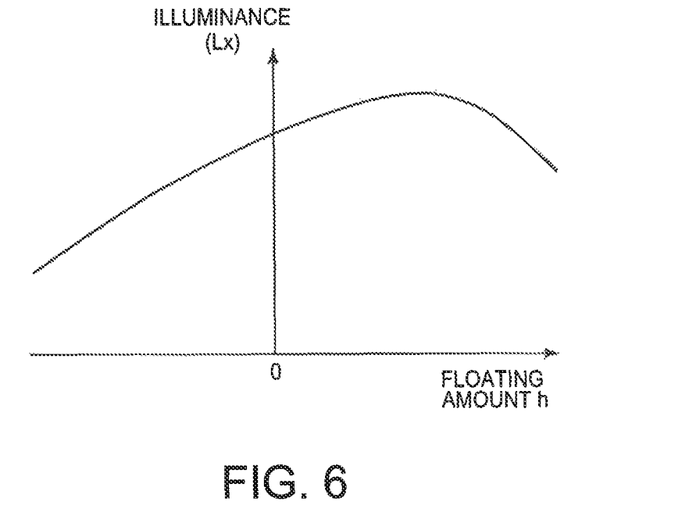
FIG. 6 is a graph illustrating a light intensity distribution property in a height direction at a reading position in an illuminating device.

FIG. 6 is an example of a graph illustrating a height-direction light intensity distribution property at the reading position A in the exemplary configuration illustrated in FIG. 4. Generally, the graph has a light intensity distribution property which has a maximum point of illuminance on a higher side (in a direction close to the illumination) and which gradually decreases to a lower side (in a direction apart from the illumination).

Figure 7:
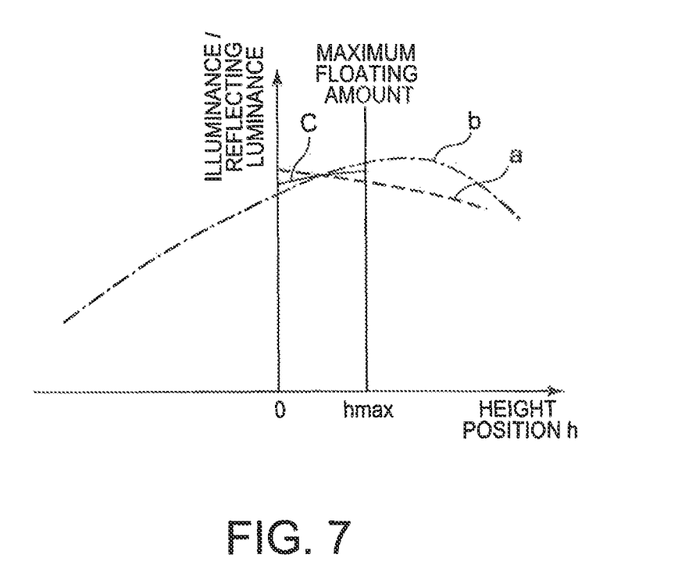
FIG. 7 is a graph illustrating a relation between a floating amount of a sheet and reflecting luminance obtained as a result of offset of the reflecting luminance illustrated in FIG. 5 with the light intensity distribution property illustrated in FIG. 6.

FIG. 7 is an example of a graph illustrating a relation between a floating amount of a sheet and reflecting luminance obtained as a result of offset of the reflecting luminance illustrated in FIG. 5 with the light intensity distribution property illustrated in FIG. 6. The graph illustrates, in a full line, a reflecting luminance property c which is finally obtained when an image is acquired in the illuminating device 2 having the light intensity distribution property b as illustrated in an alternate long and short dash line in FIG. 6 with respect to a sheet P having the reflecting luminance property a as illustrated in a dashed line in FIG. 5, within a range from a position without floating (h=0) to a maximum floating position (h=hmax) in conveying variation. When the slope of the reflection property of the sheet P is different from the slope of the light intensity distribution property of the illuminating device 2, reflecting luminance of the sheet P depends on a height position, and the reflecting luminance of the sheet P cannot be acquired accurately.

Figure 8A:
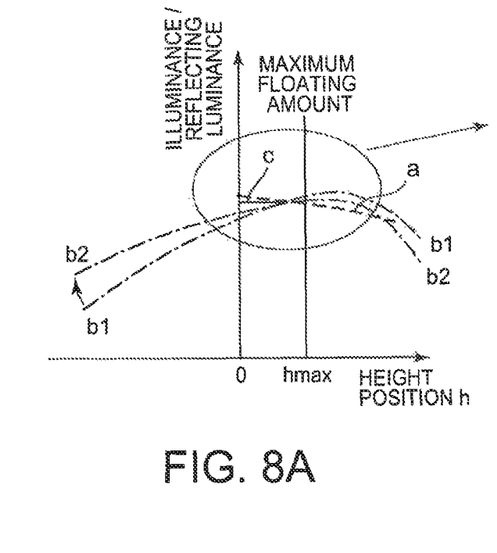
FIG. 8A is a graph to explain a method for decreasing an influence of a backing according to Embodiment 1 and FIG. 8B is an enlarged view of an essential part of FIG. 8A.
Figure 8B:
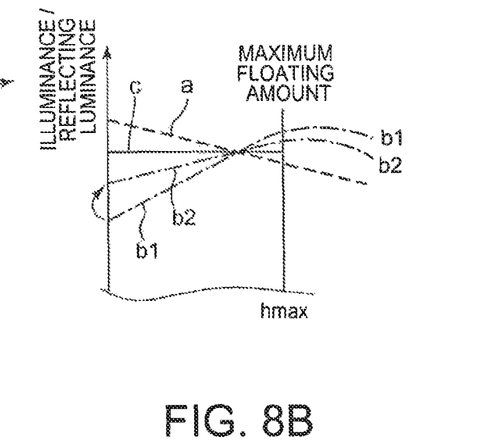

FIGS. 8A and 8B are graphs to explain a method for decreasing the influence of a backing according to Embodiment 1. FIG. 8A is an example of a graph which illustrates a reflecting luminance property a with respect to a floating amount (a height position) h of a sheet and a height-direction light intensity distribution property b1 of the illuminating device 2 at the reading position A, and which indicates that a light intensity distribution property b2 is formed by rotating the light intensity distribution property b1 at an attachment position of the illuminating device so that a reflecting luminance property c of the sheet at the reading position can be made substantially uniform within the maximum floating amount hmax by means of the light intensity distribution property b2. Further. FIG. 8B is enlarged view of an essential part in a circled part in FIG. 8A.

Figure 9A:
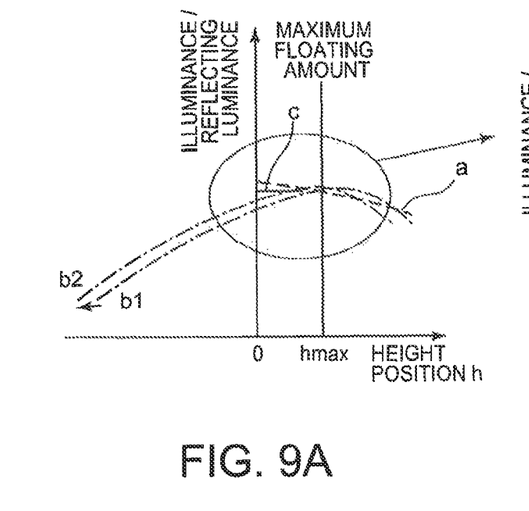
FIG. 9A is a graph to explain a method for decreasing an influence of a backing according to Embodiment 1 and FIG. 9B is an enlarged view of an essential part of FIG. 9A.
Figure 9B:
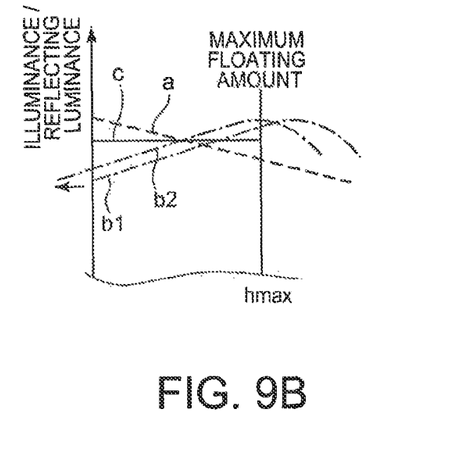

FIGS. 9A and. 9B are graphs to explain other methods for decreasing the influence of a backing effect according to Embodiment 1. FIG. 9A is an example of a graph which illustrates a reflecting luminance property a with respect to a sheet floating amount h and a height-direction light intensity distribution property b1 at the reading position A of the illuminating device 2, and which indicates that a light intensity distribution property b2 is formed by horizontally moving the light intensity distribution property b1 at an attachment position of the illuminating device 2 so that a reflecting luminance property c of the sheet P at the reading position A can be made substantially uniform within the maximum floating amount hmax by means of the distribution property b2. Further, FIG. 9B is enlarged view of an essential part in a circled part in FIG. 9A.

The examples illustrated in FIGS. 8A and 8B and FIGS. 9A and 9B illustrate reflecting luminance which is finally obtained when an image is acquired in such a manner that the slope of the reflection property of the sheet P and the slope of the light intensity distribution property of the illuminating device 2 are made equal to each other in reverse polarities by the configuration of the illuminating device 2 within the range from the position without floating (h=0) to the maximum floating amount (h=hmax) in the conveying fluctuation. The slope of the reflection property of the sheet P as illustrated in a dashed line is offset with the slope of the light intensity distribution property of the illuminating device 2 as illustrated in an alternate long and short dash line, and thus the reflecting luminance does not depend on the height position, thereby resulting in that the reflecting luminance of the sheet P can be acquired accurately.

A step of adjusting the light intensity distribution property of the illuminating device 2 to the reflecting luminance property of the sheet P is performed, for example, such that the reflecting luminance property of a sheet P assumed to be used in the image reading device 200 is acquired in advance and the step is performed in designing the illuminating device 2 according to the reflecting luminance property.

For example, a sheet to be processed is set in advance. Further, the maximum floating amount is limited by a structure of a part where the sheet passes the reading position A. Accordingly, the reflecting luminance property (variation property) a with respect to the floating amount shown in FIGS. 8A and 8B or FIGS. 9A and 9B is obtained by preparing a plurality of sheets to be processed and collecting data on reflecting luminance of the plurality of sheets while changing a guide (not illustrated) position which limits (sets) the maximum floating amount.

Further, when placement positions of the white reference plate W, a sheet to be conveyed, and the illuminating device 2 are set, the height-direction light intensity distribution property b at the reading position as illustrated in FIGS. 8A and 8B or FIGS. 9A and 9B is set. As described above, as a height position h to a surface (a height position=0) of the white reference plate W becomes higher, the illuminance increases and reaches a maximum point, and as the height h becomes lower, the illuminance decreases. Accordingly, the height-direction light intensity distribution property b1 is obtained by performing data acquisition using the sheets while changing a distance from the height position=0 to the height position=the maximum floating amount.

From the above-mentioned result, the light intensity distribution property b2 at the reading position A in the illuminating device 2 is calculated so that the light intensity distribution property b2 is substantially uniform in a range of the reflecting luminance property c from "the height position h=0" up to "the height position h=the maximum floating amount hmax." A placement position of the illuminating device 2 where the light intensity distribution property of the illuminating device 2 thus calculated can be obtained is stored in the illumination moving distance table 7.

As a result, when a sheet (or its type) to be processed by the image reading device 200 is set in the image reading device 200, the illumination moving structure 6 moves the placement position of the illuminating device 2 with reference to the illumination moving distance table 7 with respect to the sheet thus set.

For example, in a case where the image reading device 200 is used even in on-line processing and the type of sheets is not changed, that is, for example, in a case where the same type of sheets such as the same type of paper currencies are printed in large quantities and the image reading device 200 is used to verify the quality of the sheets after the printing, if the placement of the illuminating device 2 as mentioned above is set at the beginning of driving the image reading device 200, it is not necessary to change the placement position of the illuminating device for the remaining sheets which are subsequently conveyed continually.

As discussed above, according to Embodiment 1, it is possible to provide an image reading device which can offset a variation property in which reflecting luminance varies due to a backing effect caused by changes in a distance between a white reference plate and sheets due to conveying flutters of the sheets at a reading position, by changing a light intensity distribution property by changing a placement position of an illuminating device.

Figure 10:
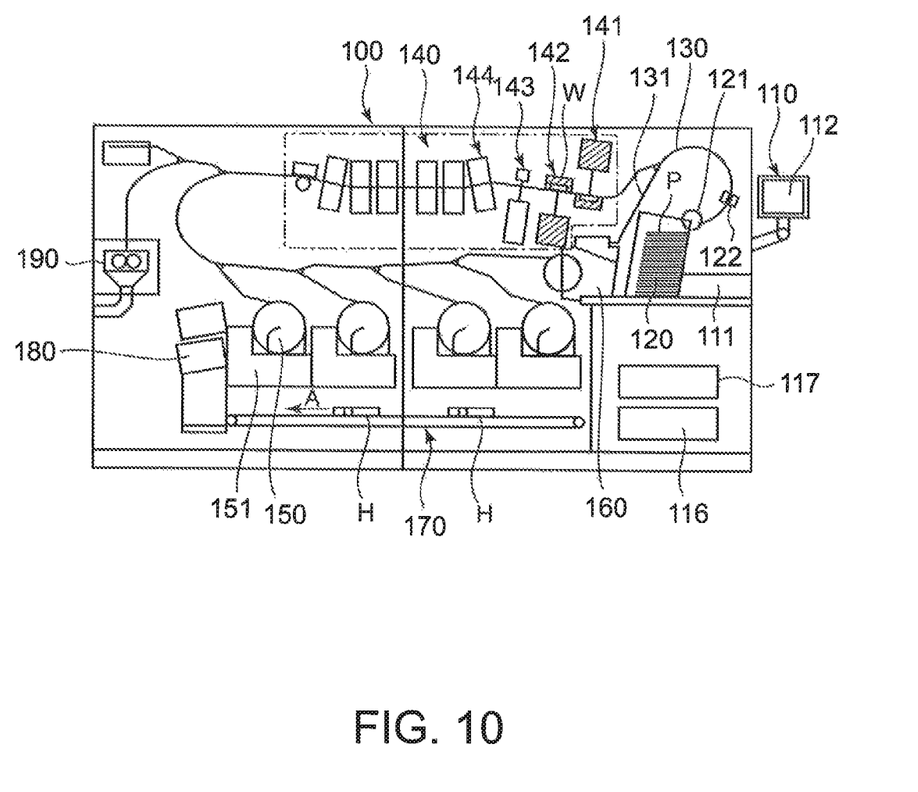
FIG. 10 is a schematic diagram illustrating a configuration of a sheet handling apparatus according to Embodiment 2.

[EMBODIMENT 2] FIG. 10 a view illustrating a configuration of a sheet handling apparatus according to Embodiment 2, and the sheet handling apparatus is equipped with an image processing apparatus according to Embodiment 1.

A sheet handling apparatus 100 includes a main controller 116 for controlling an entire device based on operating instructions from an operation & display PC 110, a conveying controller 117 for sorting and conveying sheets according to instructions from this main controller 116, and the like, and sheets supplied based on operating instructions of an operator are processed. A detailed description of the sheet handling apparatus 100 is given below.

The operation PC 110 includes an operation & display portion (operation & display means) 112 which incorporates a touch panel (input means) into a display (display means). Further, as the input means, a keyboard, a mouse, and the like (not illustrated) are also connectable.

The operation & display portion 112 is operated by an operator who operates the sheet handling apparatus 100. The content of a process for sheets to be processed is instructed to the operation & display portion 112 by this operation. The operator performs, for example, specification of a sheet type of sheets to be processed, normal/damaged discrimination level specification, specification of accumulation & banding devices, or selection of an audit process or a counting process.

In the sheet handling apparatus 100, a bundle of sheets (for example, 1000 sheets) supplied in a supply portion 120 according to its handling unit are taken out one by one in turn from an uppermost sheet P by a rotor (taking-out device) 12. The sheet P thus taken out is conveyed by a conveyor path 130 and a sheet discrimination device (sheet discrimination means) 140 judges the authenticity of the sheet P (whether the sheet P is genuine (an authentic sheet) or fake (a counterfeit sheet)) and judges whether the sheet P is normal or damaged (whether the sheet P is an authentic and recyclable sheet (a normal sheet) or an authentic but non-recyclable sheet (a damaged sheet)).

The sheet handling apparatus 100 transmits a judgment result of each sheet to a main controller 116 and to a conveying controller 117 at the same time.

The conveying controller 117 specifies a final accumulation place of the sheet P based on the received judgment result. The sheet P to which the accumulation place is specified as such is accumulated, for example, by an impeller accumulation device 150. When the number of accumulated sheets P reaches a predetermined, number of sheets (for example, 100 sheets), the sheets P are bundled every 100 sheets by a heat adhesive paper belt by a 100 sheets bundling device (a banding device) 151 disposed below the impeller accumulation device 150, thereby forming a 100 sheets bundle H. This process result is transmitted to the main controller 116 from the conveying controller 117.

The 100 sheets bundle H thus formed is discharged onto a conveyer 170 disposed below, and conveyed in a direction of an arrow A as illustrated.

in the embodiment than illustrated, four sets of accumulation & banding devices (sorting process means) each including an impeller accumulation device and a banding device and performing a sorting process are disposed, and each of the accumulation & banding devices discharges 100 sheets bundles H.

The 100 sheets bundles H thus discharged are accumulated in a 100 sheets bundle accumulation portion 180, and then further bundled every time when the number of 100 sheets bundles reaches 10, thereby forming a 1000 sheets bundle.

Further, an eliminated sheets accumulation portion 160 is disposed at the end of the conveyor path 130. Sheets judged as eliminated sheets by the sheet discrimination device 140 or sheets judged as poor extraction by the conveyor detector 122 are conveyed by a conveyor path 131 branched off from the conveyor path 130 and accumulated in this eliminated sheets accumulation portion 160. Since normal sheets, damaged sheets, abnormally-conveyed sheets, and counterfeit sheets are accumulated in a mixed manner in this eliminated sheet accumulation device 160, it is possible to perform a re-judging process on the eliminated sheets accumulated in the eliminated sheet accumulation device 160 such that the eliminated sheets are taken out therefrom and resupplied to the supply portion 120.

Further, a cutting device 190 is disposed at the downstream of the sheet discrimination device 140 in a conveying direction, and sheets judged as damaged sheets by the sheet discrimination device 140 are conveyed to this cutting device 190 and cut into pieces. The damaged sheets are sheets which cannot be re-circulated, and the damaged sheets are cut into pieces when the counted number of sheets to be cut is surely confirmed (the number of sheets judged as the damaged sheets is identical with the number of sheets transmitted to the cutting device). Counted-number data of the sheets thus cut is transmitted to the main controller 116 from the conveying controller 117.

As discussed above, the sheet handling apparatus 100 sorts the sheets supplied in the supply portion 120 into normal sheets, damaged sheets, and eliminated sheets, and performs corresponding processes to respective groups of sheets thus sorted. Further, counted-number data of each of the groups of sheets thus sorted is transmitted to the main controller 116 from the sheet discrimination device 140 or the conveying controller 117.

The main controller 116 transmits a processing result of the sheets received from the sheet discrimination device 140 or the conveying controller 117 to the operation PC 110 per process unit (for example, 1000 sheets).

The sheet discrimination device 140 is constituted by a front face reflection detecting device 141, a rear face reflection detecting device 142, a magnetism detecting device, a shape detecting device, a transmission detecting device, a fluorescence detecting device, a thickness detecting device, and the like, which are provided along the conveyor path 130.

Figure 11:
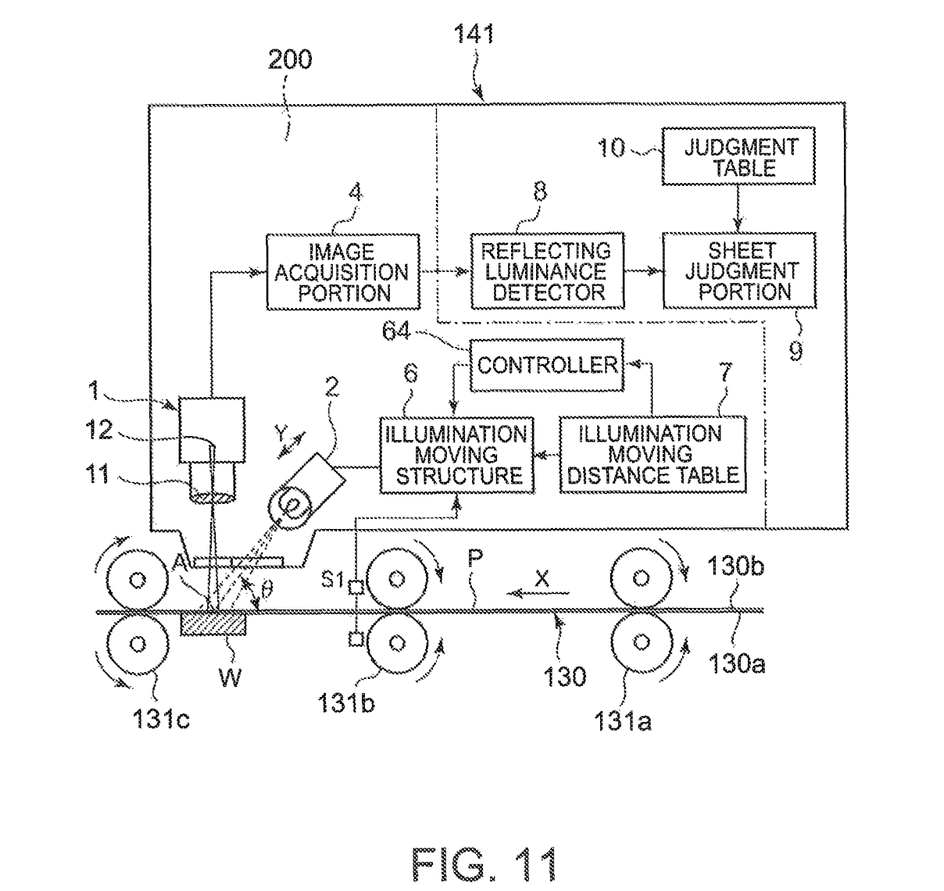
FIG. 11 is a schematic configuration diagram illustrating an example in which the image reading device according to Embodiment 1 is used for a rear face reflection detecting device of FIG. 10.

FIG. 11 is an example in which the image reading device according to Embodiment 1 is used for the front face reflection detecting device 141 of FIG. 10. Note that the rear face reflection detecting device 142 is configured in the same manner as the front face reflection detecting device 141, and therefore, the explanation of the rear face reflection detecting device 142 is omitted. Note that this front face reflection detecting device 141 includes a white reference plate W.

As described above, a bundle of 1000 sheets of the same sheet type are supplied to a supply portion 120 of the sheet handling apparatus 100 illustrated in FIG. 10. The operator inputs a sheet type, a normal/damaged discrimination level, and the feed number of sheets from an operation & display portion 112.

An illumination moving structure 6 is constituted by an illuminating angle moving structure 61, an X direction moving structure 62, and a Y-direction mover mechanism section 63 as illustrated in FIG. 1B. Each of the structures 61 to 63 of the illumination moving structure 6 is connected to a controller 64. The controller 64 acquires moving amounts of an illuminating device 2 from an illumination moving distance table 7 based on the sheet type thus specified by the operator, and outputs these moving amounts to the respective structures, sequentially. Each of the structures includes a stepping motor, and moves the illuminating device by performing rotative movement based on its corresponding moving amount.

The illuminating angle moving structure (illuminating angle moving means) 61 moves in directions in which an illuminating angle θ formed by a line which connects an illumination center of the illuminating device 2 to a reading position A with respect to a conveyor path 130 increases and decreases.

The X direction moving structure (X direction moving means) 62 moves in an X direction parallel to a conveying direction while maintaining the illuminating angle.

The Y direction moving structure (Y direction moving means) 63 moves in a Y direction which is a lengthwise direction of an illumination optical axis while maintaining the illuminating angle.

Just after that the input operation by the operator is finished, movement of the illuminating device 2 by the illumination moving structure 6 starts. Since this moving distance is a millimeter order and thus the moving distance is small, the movement is completed just after the input by the operator is finished.

When position setting of the illuminating device 2 is completed as such, the taking-out device 121 takes out a bundle of sheets supplied to the supply portion 120 one by one from the uppermost sheet to the conveyor path 130 so that the sheets thus taken out are conveyed. Reflection data of a sheet P which is conveyed as such and reaches the reading position A is read by a camera 1 while the sheet P is conveyed. This is the same as described in Embodiment 1.

A sensor S1 herein is a sensor for detecting a sheet P to be conveyed. When a tip of the sheet P is detected by this sensor S1, timing when the sheet P arrives at the reading position is set and reading of the sheet P is started based on the setting. The reflection data of the sheet P thus read is converted into processible data which can be processed by an image acquisition portion 4 and a reflecting luminance detector 8.

The processible data herein indicates data formed by acquiring data in a detection range set for each of sheet type judgment, authenticity judgment, and normal/damaged judgment from front face reflection data so as to perform corresponding judgment by performing the after-mentioned calculation of color data as needed.

A judgment portion 9 compares a calculation result calculated by the reflecting luminance detector 8 with criteria stored in a judgment table 10 to perform judgment. The following describes a judgment method, more specifically.

The sheet type judgment is performed in such a manner that entire front face data of a sheet is acquired as the processible data and its pattern, which varies depending on a sheet type, is compared with reference patterns stored in the judgment table 10. A sheet type and a conveying direction of a target sheet to be processed are set according to this judgment result. When the sheet type of this sheet is different from a sheet type set by the operator, the sheet is accumulated in the eliminated sheets accumulation portion 160.

For the authenticity judgment, it is judged whether a predetermined detection position set per sheet type and conveying direction set in the sheet type judgment includes special information to perform the authenticity judgment, as the processible data. The judgment method is performed so as to judge whether the special information thus detected is within a range between an upper limit and a lower limit of an authenticity judgment level stored in the judgment table 10. A sheet which is different from the specified sheet type as a result of the authenticity judgment is accumulated in the eliminated sheets accumulation portion 160.

For the normal/damaged judgment, color data which is generated by combining, at a predetermined ratio, respective color data of R (red), G (green), and B (blue) which are obtained from front face reflected light of a sheet obtained from the camera is used as the processible data. Since it is preferred that a degree of damage of a sheet is not different from recognition by human eyes, the above color calculation is, for example, performed so that the normal/damaged judgment is performed in consideration of a relative spectral sensitivity curve (a curve which indicates the sensitivity of human eyes relative to a wavelength of light).

A judgment level is stored in the judgment table 10, but this judgment level is set based on a result obtained by performing data acquisition in the front face reflection detecting device 141 in advance.

The judgment portion 9 compares the criteria stored in the judgment table 10 with a calculation result calculated by the reflecting luminance detector 8 to perform judgment.

The judgment result is, for example, output to a conveying controller (not illustrated). The conveying controller sorts and conveys the sheet based on the judgment result. For example, a normal sheet is accumulated in a normal sheet accumulation portion (not illustrated), and a damaged sheet is accumulated in a damaged sheet accumulation portion (not illustrated). Further, sheets may be transmitted to a bundling portion and bundled as needed every time when the number of sheets sorted and accumulated reaches 100, so as to form a 100 sheets bundle.

The image reading device described in Embodiment 1 can be incorporated as part of a print quality inspection device so that the image reading device can be used as a sheet handling apparatus. In this case, target sheets are printed sheets of the same type, and image reading means reads images of the sheets based on the sheet type or thickness information of the printed sheets, in accordance with that placement position of an illuminating device which is set in advance according to the aforementioned method. Image data thus read are subjected to judgment of a print quality of the sheets by the sheet discrimination device. The sorting process device performs a specified sorting process such as accumulation or banding based on a judgment result of the sheets.

As described above, floating from a white reference plate occurs because of flutter of a sheet to be conveyed, which causes influence of a backing in which reflecting luminance of a sheet varies depending on its floating amount. In terms of this influence of a backing, according to the present embodiment, an illuminating device is disposed based on a reflecting luminance property (variation property) according to a distance between the sheet and the white reference plate serving as a background, so as to have a light intensity distribution property which offsets the variation property. This makes it possible to realize an image reading device which can perform highly precise image acquisition in terms of reflecting luminance. Further, a sheet handling apparatus including the image reading device can perform a highly precise inspection and an inspection with high reproducibility.

What is claimed is:

1. An image reading device comprising:
   illuminating means for illuminating a reading position where a sheet is conveyed along a conveyor path;
   optical reading means for reading reflected light of the sheet illuminated by the illuminating means, when the sheet passes the reading position;
   a white reference plate disposed opposite to the optical reading means with the reading position sandwiched therebetween;
   a moving structure to move the illuminating means so that an illuminating angle and a Y direction moving distance are changed, the illuminating angle being an angle which an illumination optical axis of the illuminating means makes with respect to the conveyor path, and the Y direction being a lengthwise direction of an illumination optical axis while maintaining the illuminating angle, the moving structure including:
      illuminating angle moving means for moving a placement position of the illuminating means in directions in which the illuminating angle increases and decreases; and
      Y direction moving means for moving the placement position of the illuminating means in the Y direction;
   input means for inputting a sheet type or a thickness information of the sheet which are read by the optical reading means; and
   control means for controlling the moving structure based on the sheet type of the sheet or the thickness information of the sheet input by the input means to change the illuminating angle and the Y direction moving distance of the illuminating means, wherein
   the control means has a table storing the illuminating angle and Y direction moving distance which correspond to the sheet type or the thickness information of the sheet, and
   the control means sets the illuminating angle moving amount and the Y direction moving amount, which are read from the table based on the sheet type or thickness information of the sheet, in the illuminating angle moving means and the Y direction moving means, respectively.

2. A sheet handling apparatus comprising:
   operation and display means for operating, by an operator, settings of sheets to be processed;
   a conveyor path for conveying supplied sheets based on information input via the operation and display means;
   an image reading device for reading images of the sheets conveyed along the conveyor path;
   sheet discrimination means for discriminating image data read by the image reading device; and
   sorting process means for accumulating or bundling the sheets based on a judgment result of the sheet discrimination means, wherein
   the operation and display means includes input means for inputting a sheet type or thickness information of the sheets to be processed,
   the image reading device includes:
      illuminating means for illuminating a reading position where a sheet is conveyed along a conveyor path;
      optical reading means for reading reflected light of the sheet illuminated by the illuminating means, when the sheet passes the reading position;
      a white reference plate disposed opposite to the optical reading means with the reading position sandwiched therebetween;
      a moving structure to move the illuminating means so that an illuminating angle and a Y direction moving distance are changed, the illuminating angle being an angle which an illumination optical axis of the illuminating means makes with respect to the conveyor path, and the Y direction being a lengthwise direction of the illumination optical axis while maintaining the illuminating angle, the moving structure including
         illuminating angle moving means for moving a placement position of the illuminating means in directions in which the illuminating angle increases and decreases, and
         Y direction moving means for moving the placement position of the illuminating means in the Y direction; and
      control means for controlling the moving structure based on the sheet type of the sheet or the thickness information of the sheet input by the input means to change the illuminating angle and the Y direction moving distance of the illuminating means,
         the control means having a table storing the illuminating angle and Y direction moving distance which are corresponding to the sheet type or the thickness information of the sheet, and
         the control means setting the illuminating angle moving amount and the Y direction moving amount, which are read from the table based on the sheet type or thickness information of the sheet, in the illuminating angle moving means and the Y direction moving means, respectively, and
      reading by the optical reading means is performed at the placement position of the illuminating means set by the control means.

3. The sheet handling apparatus according to claim 2, wherein
   the sheets are printed sheets of the same type,
   the image reading device reads the images of the sheets based on a placement position of the illuminating means set in advance based on the sheet type or thickness information of the printed sheets,
   the sheet discrimination means judges print qualities of the sheets based on the images read by the image reading device, and
   the sorting process means performs a sorting process on the sheets based on judgment results of the sheet discrimination means.

* * * * *